United States Patent
O'Donovan et al.

[19]

[11] Patent Number: 5,825,325
[45] Date of Patent: Oct. 20, 1998

[54] INTERSATELLITE COMMUNICATIONS SYSTEMS

[75] Inventors: Val O'Donovan; Gary Beauchamp; Robert Peach, all of Cambridge, Canada

[73] Assignee: Com Dev Limited, Canada

[21] Appl. No.: 715,065

[22] Filed: Sep. 17, 1996

[30] Foreign Application Priority Data

Dec. 21, 1995 [CA] Canada ................................ 2165875

[51] Int. Cl.⁶ .................................................. H04B 7/185
[52] U.S. Cl. ........................... 342/353; 342/354; 455/13.1
[58] Field of Search ................................ 342/352, 353, 342/354; 455/13.1, 13.3, 12.1; 370/316, 323, 325, 326

[56] References Cited

U.S. PATENT DOCUMENTS

| | | |
|---|---|---|
| 3,636,452 | 1/1972 | Nuding . |
| 4,029,902 | 6/1977 | Bell, Jr. et al. . |
| 4,144,495 | 3/1979 | Metzger . |
| 4,228,401 | 10/1980 | Wachs et al. . |
| 4,381,562 | 4/1983 | Acampora . |
| 4,425,639 | 1/1984 | Acampora et al. . |
| 4,456,988 | 6/1984 | Nakagome et al. . |
| 4,480,328 | 10/1984 | Alaria et al. ............................ 370/323 |
| 4,491,947 | 1/1985 | Frank ...................................... 370/323 |
| 4,691,882 | 9/1987 | Young . |
| 4,706,239 | 11/1987 | Ito et al. ................................ 370/325 |
| 4,813,036 | 3/1989 | Whitehead . |
| 4,858,225 | 8/1989 | De Santis . |
| 4,858,229 | 8/1989 | Rosen et al. . |
| 4,868,886 | 9/1989 | Assai et al. . |
| 5,033,108 | 7/1991 | Lockwood . |
| 5,068,813 | 11/1991 | Thoen . |

(List continued on next page.)

FOREIGN PATENT DOCUMENTS

| | | |
|---|---|---|
| 1084183 | 8/1980 | Canada . |
| 2066712 | 5/1991 | Canada . |
| 2068875 | 5/1991 | Canada . |
| 2073336 | 9/1991 | Canada . |
| 2061090 | 9/1992 | Canada . |
| 2087542 | 11/1992 | Canada . |
| 2089043 | 9/1993 | Canada . |
| 2114851 | 12/1993 | Canada . |
| 2125371 | 1/1995 | Canada . |

OTHER PUBLICATIONS

"The Application of Surface Acoustic Wave Filters to Communications Satellite Design" AIAA–94–1007–CP, pp. 707–715 R.C. Peach, F.Z. Bi and B. Van Osch COM DEV Ltd., Cambridge, Ontario, Danada.

SS/FDMA System for Digital Transmission "Application of Bandwidth–Variable SAW Filter Matrix for Efficient Interbeam Connection in Multibeam Satellite" H. Shinonaga and Y. Ito KDD R&D Laboratories Nakameguro 2–1–23, Meguro, Tokyo 153 Japan.

*Primary Examiner*—Gregory C. Issing
*Attorney, Agent, or Firm*—Jones, Day, Reavis & Pogue

[57] ABSTRACT

An improved multi-beam bent-pipe communications satellite system and method includes a subchannel switching processor for extracting and switching subchannels of information to and from a plurality of uplink and downlink beams and an intersatellite link for routing certain of the extracted subchannels to another satellite in the system. The subchannel switching processor preferably employs a partial subchannelization processor that combines a coaxial switching network for switching some of the uplink channels at the channel level with an analog or digital transparent subchannel switching network connected to a portion of the uplink channels for extracting and switching at the subchannel level. The switched subchannels are combined to form channels, and then routed to either the downlink beams (where they are combined with other switched channels), or to the intersatellite link for transmission to another satellite. The system of the present invention could be a constellation of satellites, each satellite in the constellation connected to a plurality of other satellites using a plurality of intersatellite links.

28 Claims, 11 Drawing Sheets

U.S. PATENT DOCUMENTS

| | | |
|---|---|---|
| 5,129,095 | 7/1992 | Davis et al. . |
| 5,233,609 | 8/1993 | Hunton . |
| 5,274,627 | 12/1993 | De Santis . |
| 5,274,840 | 12/1993 | Schwendeman . |
| 5,303,286 | 4/1994 | Weideman . |
| 5,343,512 | 8/1994 | Wang et al. . |
| 5,355,512 | 10/1994 | Profera, Jr. . |
| 5,394,560 | 2/1995 | Kane . |
| 5,396,643 | 3/1995 | Frenzer et al. . |
| 5,408,515 | 4/1995 | Bhagat et al. . |
| 5,428,814 | 6/1995 | Mort et al. . |
| 5,499,237 | 3/1996 | Richetta et al. ................... 370/400 |

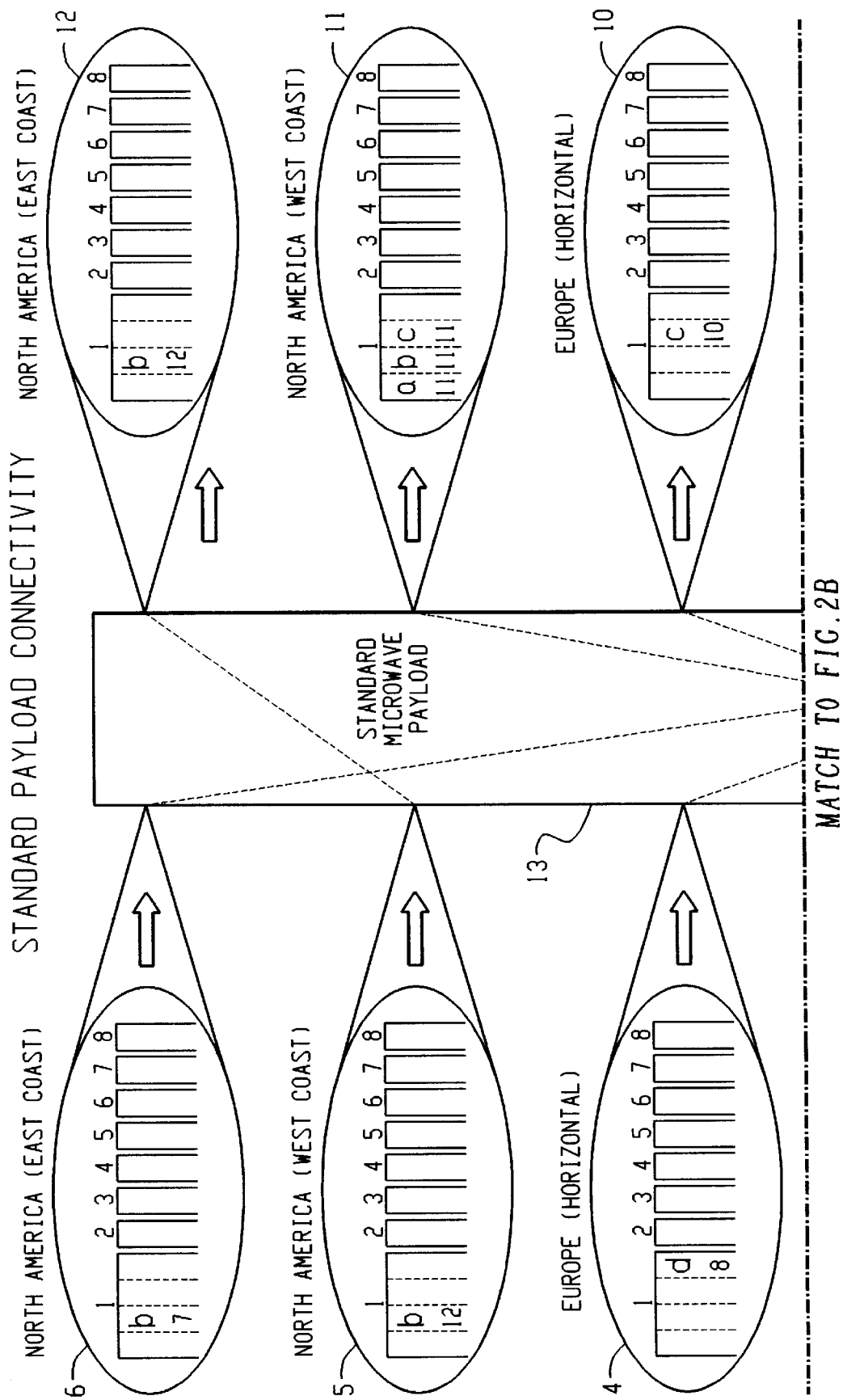
Fig. 2A (PRIOR ART) STANDARD PAYLOAD CONNECTIVITY

INTERSATELLITE COMMUNICATIONS SYSTEMS

BACKGROUND OF THE INVENTION

This invention relates to satellite communications systems and particularly to systems of multibeam communications satellites with direct intersatellite links.

The early communications satellites were used as "dumb" repeaters operating in a bent-pipe mode. ("Bent-pipe" is a term in general use and well understood by those skilled in the art). Initially, no significant processing other than signal amplification was carried in the satellite payload and the information relayed back to Earth was a replica of the information from the source. The advantages of this type of satellite were simplicity and low front-end capital and launch costs. As satellite systems became more sophisticated, multibeam satellites, still operating in the bent-pipe mode were introduced whereby one or more sources could relay messages to several destinations. The architecture of these systems was still fairly rigid and allowed little or no flexibility in switching between sources or destinations. Typical were the first broadcast satellites that relayed information to several geographic regions. An example would be the system described in U.S. Pat. No. 3,541,553 (to "Gubin") issued on Nov. 17, 1970 and assigned to RCA Corporation.

Later, satellites with on-board switching capability were introduced. In these systems, each incoming beam from Earth would, typically, carry several frequency-multiplexed channels. Existing fixed satellite service (FSS) systems now generally employ multibeam satellites having input demultiplexers near the front end of the satellite which separate incoming beams into a number of transponder channels. Prior to high-power amplification, these channels are inter-beam switched by means of coaxial switches so that communications intelligence arriving via one of the incoming beams can be directed to one of several output beams. Path selection is at the discretion of ground control. Connections are made on a relatively broad channel basis, i.e. all of the information in one transponder channel is switched in its entirety. In some instances, by using power-combining techniques, information from two or more sources could be sent to a common destination. This approach is, however, costly and wasteful of resources.

Other, quite separate, developments have concerned the enabling of satellites to communicate with each other by the use of direct electromagnetic (e.g. radio or optical) links between the satellites. These intersatellite links are used to pass intelligence (for control or communications) between orbiting satellites. In U.S. Pat. No. 4,691,882 (to "Young") issued Sep. 8, 1987 and assigned to British Aerospace PLC, for example, clusters of cooperating communications satellites act in unison as one large satellite and are radio-linked together. In other instances, defense and other government satellite systems, e.g. TDRSS (the Traffic and Data Relay Satellite System) use intersatellite links.

Also, a number of important developments have occurred in the mobile communications markets. For the hand-held-terminal market, interest is focused on low-earth-orbit (LEO) and medium-earth-orbit (MEO) satellite constellations. The geostationary (GEO) market is also undergoing major changes. Traditional point-to-point communications between major population centers are being converted to optical fibre and operators are now looking to provide a greater number of narrow-band links, principally to areas that are not well served by existing terrestrial infrastructure.

To this end, proposed satellites have more beams, higher effective isotropic radiated power (EIRP) and greater inter-beam connectivity and users will require less expensive ground terminals. These trends are being accelerated by data compression which is forcing operators to lease comparatively narrow bandwidths. Developments have been described in which global systems of orbiting satellites will be commissioned to provide personal communications (similar to cellular telephone service) anywhere on the Earth. Each of these satellites will be linked by intersatellite beams to as many as eight other satellites. U.S. Pat. No. 5,129,095 (Davis et al) issued Jul. 7, 1992 and assigned to Motorola, Inc. is an example of such a system. Recently proposed LEO systems (e.g. Iridium and Teledesic)[1] will support intersatellite links.

[1]Iridium and Teledesic are Registered Trade Marks.

The present and proposed communications systems using intersatellite links are constrained by the type of signals they can handle, especially with regard to protocols used and particular modulation methods employed. They tend to rely on digital switching technology and make extensive use of "smart" on-board processors. Decisions are made, at least in part, on board the satellite. Satellites employing these types of on-board digital processors are not "bent pipe" systems since the data transmitted to the satellite is partially extracted by the "smart" processor in order to determine where to route the data. Such a digital processor is also known as a "regenerative" processor, as distinguished from a bent pipe or "transparent" processor which does not extract routing information from the incoming data transmission. For these "regenerative" systems to work, subscribers are required to procure special transceivers (i.e. ground stations) which are not backward compatible and hence generally unusable with existing bent-pipe systems. Globalstar[2] is one system of global telecommunications proposed that uses bent-pipe technology. However, it relies on the terrestrial communications infrastructure for inter-regional communications: it does not propose intersatellite links.

[2]Globalstar is a Registered Trademark

With respect to the fixed satellite service systems, the mounting demand for greater connectivity and leases of fractions of transponders cannot be satisfied by simply increasing the number of beams since this aggravates the connectivity problem and leads to reduced transponder utilization efficiency. The connectivity problem was addressed in U.S. Pat. No. 4,706,239 (to "Ito") issued Nov. 12, 1987 and assigned to Kokusai Denshin Denwa Co. Ltd. In the Ito patent, every incoming radio-frequency beam is divided first into transponder channels by means of a demultiplexer as is well known in the art. Each transponder channel is further divided into subchannels by use of surface-acoustic-wave (SAW) filters. Interbeam switching is then carried out using GaAs FET switches at the relatively narrow subchannel level, rather than at the channel level as in prior systems. The output of the switches are subsequently multiplexed back into transponder channels and amplified and multiplexed for the down-link beams. In this manner, the information contained in a channel does not have to be switched as a whole, but instead can be divided and routed to a number of outgoing beams.

The problem of full interconnectivity was also addressed in U.S. Pat. No. 5,274,627 (to "De Santis") issued Dec. 28, 1993 and assigned to the International Telecommunications Satellite Organization. In the De Santis system, the incoming continuous-wave frequency-division multiple-access signal is transformed into periodic-burst time-division signals. They are routed via a switching matrix and transformed back to the frequency domain prior to channeling to the desired down-link beam or beams as continuous-wave frequency-division-multiplex signals. In the De Santis arrangement, the system is transparent to the form or protocol of the incoming signals. Although De Santis discloses a complex system for interbeam switching, it does not disclose any application of intersatellite links.

The Inmarsat 3 geostationary mobile communications system, employs on-board subchannelizing technology. The system makes use of multiple hops between Earth and satellite to communicate between two mobile users. For example, a ship communicating with a second ship would send information signals to the satellite. These signals would be switched in the satellite and sent back to Earth for control and billing purposes, resent to the satellite for further processing and then relayed to the second ship.

In a further improvement in subchannelizing technology, the present applicant has determined that, by combining the coaxial switching methods commonly used in the prior art with subchannelization methods on a portion of the transponder channels, efficiency gains similar to those of the Ito full subchannelization system can be obtained with greatly reduced hardware complexity, power consumption and launch costs. For example, in an 8-beam, 8-channel per beam satellite, by subchannelizing all 8 channels, as proposed by Ito, it is possible to produce a 25 percent improvement in transponder utilization over previous systems. However, if the same 8-beam, 8-channel system were to subchannelize only four of the eight channels, the system would require some 50 percent less hardware than the Ito system requires, and transponder utilization would be only slightly degraded (i.e. a 20 percent capacity improvement over the prior art channel-switching satellite instead of the 25 percent of the Ito system). Applicants hereby incorporate by reference the teaching of their copending U.S. patent application Ser. No. 08/633676, filed Apr. 17, 1996, entitled Repeaters for Multibeam Satellites. This application discloses several bent-pipe partial subchannelization systems as discussed above, including both analog subchannelizing architectures and a transparent digital architecture. The analog architectures combine a coaxial switching network for switching at the channel level with a subchannel switching network connected to a portion of the incoming channels which utilizes surface acoustic wave (SAW) filter banks for subchannel selection and a solid state switching matrix. The transparent digital architecture employs digital filtering and switching at the subchannel level in parallel with a coaxial switching network for switching at the channel level.

SUMMARY OF THE INVENTION

With the advent of satellite communications systems that propose to respond to the increasing demand for more flexibility and capacity while remaining competitive with other communications systems, greater ingenuity is required to offer new services at economically competitive cost. The requirement is for a bent-pipe system, i.e. one that does not restrict the nature or protocol of the information signals being transmitted. The system must also provide significant improvement in transponder efficiency in delivering both broadband and narrowband information to different destinations.

New advances in enabling the commissioning of relatively inexpensive subchannelizing systems offer new commercial opportunities hitherto not realizable. The invention described herein responds to the system requirements outlined above by providing a new form of intersatellite link that maintains the bent-pipe mode of operation. As noted above, the system described in our copending U.S. patent application Ser. No. 08/633676 also helps accomplish the objectives by providing partial subchannelization for a bent-pipe satellite system, and can be used in conjunction with the invention described herein to provide more pronounced benefits.

Figure 1:
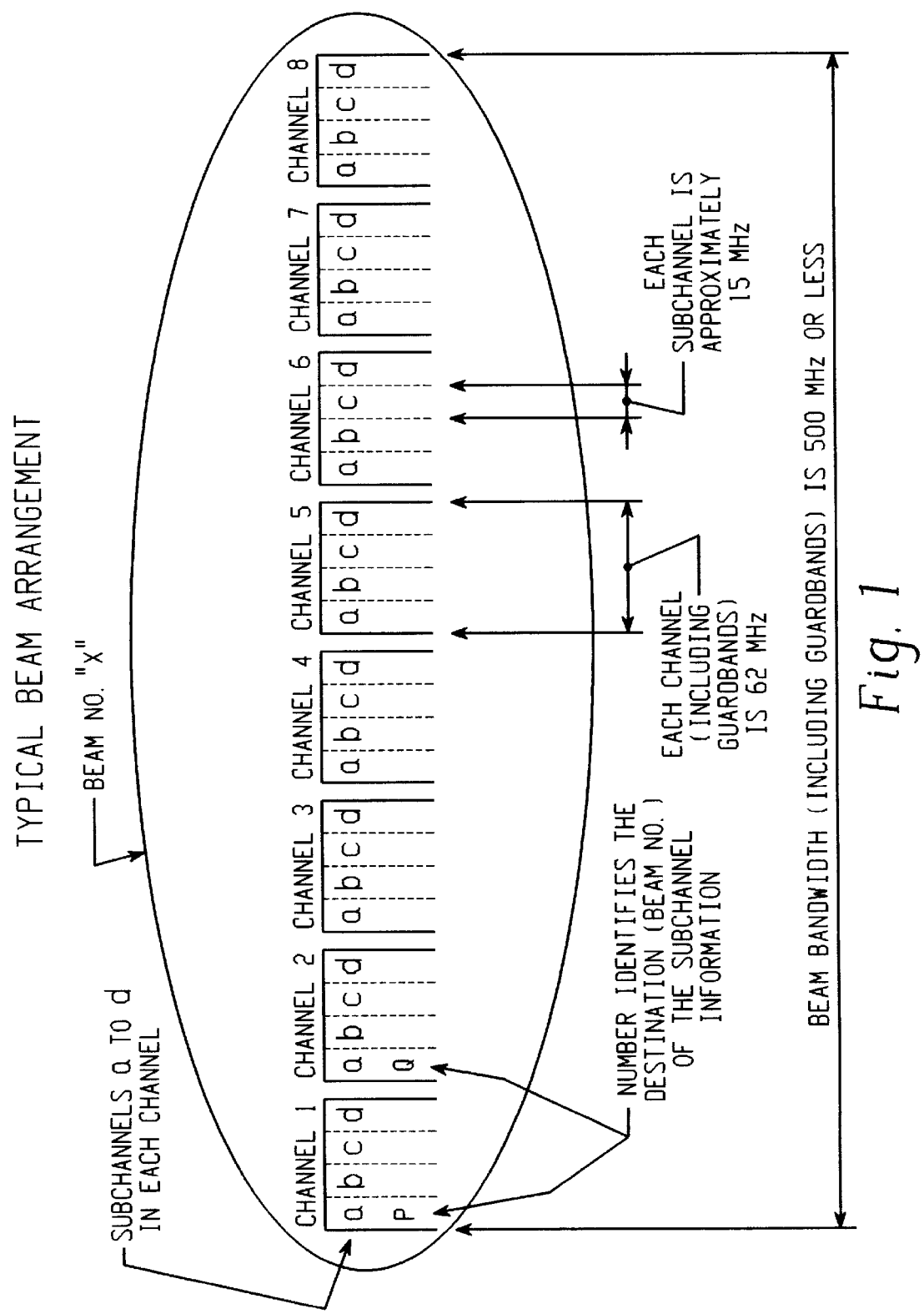
FIG. 1 shows the arrangement of a typical satellite incoming beam.

Not shown in the drawings or discussed to any extent in the description are the standard circuit components found in a satellite repeater system. These include the low-noise amplifiers, the frequency down-converters (e.g. from 14 GHz to 12 GHz) and the redundancy selection circuits.

DETAILED DESCRIPTION OF PREFERRED EMBODIMENTS

FIG. 1 in the drawings shows a typical beam (in the drawing it is given the arbitrary number "X") used in frequency-division-multiplex (FDM) satellite transmissions. Although the example given is for an incoming beam (i.e. a beam received by a communications satellite), outgoing beams (i.e. beams transmitted from a communications satellite) would have a similar make-up. The following is an example only and the quantities specified for bandwidths and frequencies used are purely notional. For instance, while the channels are described as being of equal bandwidth and the subchannels are also described as being of equal bandwidth, this is not necessarily the case and design considerations may require the channels to be of different bandwidths, and the subchannels to be of different bandwidths. Furthermore, the number of channels per beam need not be eight since there could be a different number of channels (greater or fewer than eight) in each beam.

In the example shown in FIG. 1, each beam is divided into eight non-overlapping frequency-separated channels. Each channel (including interchannel guardbands) is about 62 MHz in bandwidth and thus the bandwidth of the beam itself is no more than 500 MHz. The center frequency of the beam could be at some regular communication frequency (e.g. L-Band, S-Band, C-Band, Ku-Band or Ka-Band). Every channel is divided into four equal subchannels, each subchannel having a bandwidth no greater than 15 MHz. (Some allowance may have to be made for guard bands).

For purpose of discussion in this disclosure, the first to fourth subchannels in each channel are identified respectively by the letters "a", "b", "c" and "d". In the example, each subchannel is destined for a particular output destination (i.e. beam) and is accordingly labelled to facilitate understanding of the description. For example, a subchannel destined for downlink beam "P" carries an appropriate identifier in the drawings. More specifically, a subchannel in channel 1 of beam 1 that has the identifier "a28" is a subchannel "a" (the first of the four subchannels in channel 1) that is destined for the outgoing beam 28. The output will be placed in beam 28, channel 1, subchannel "a".

Figure 2B:
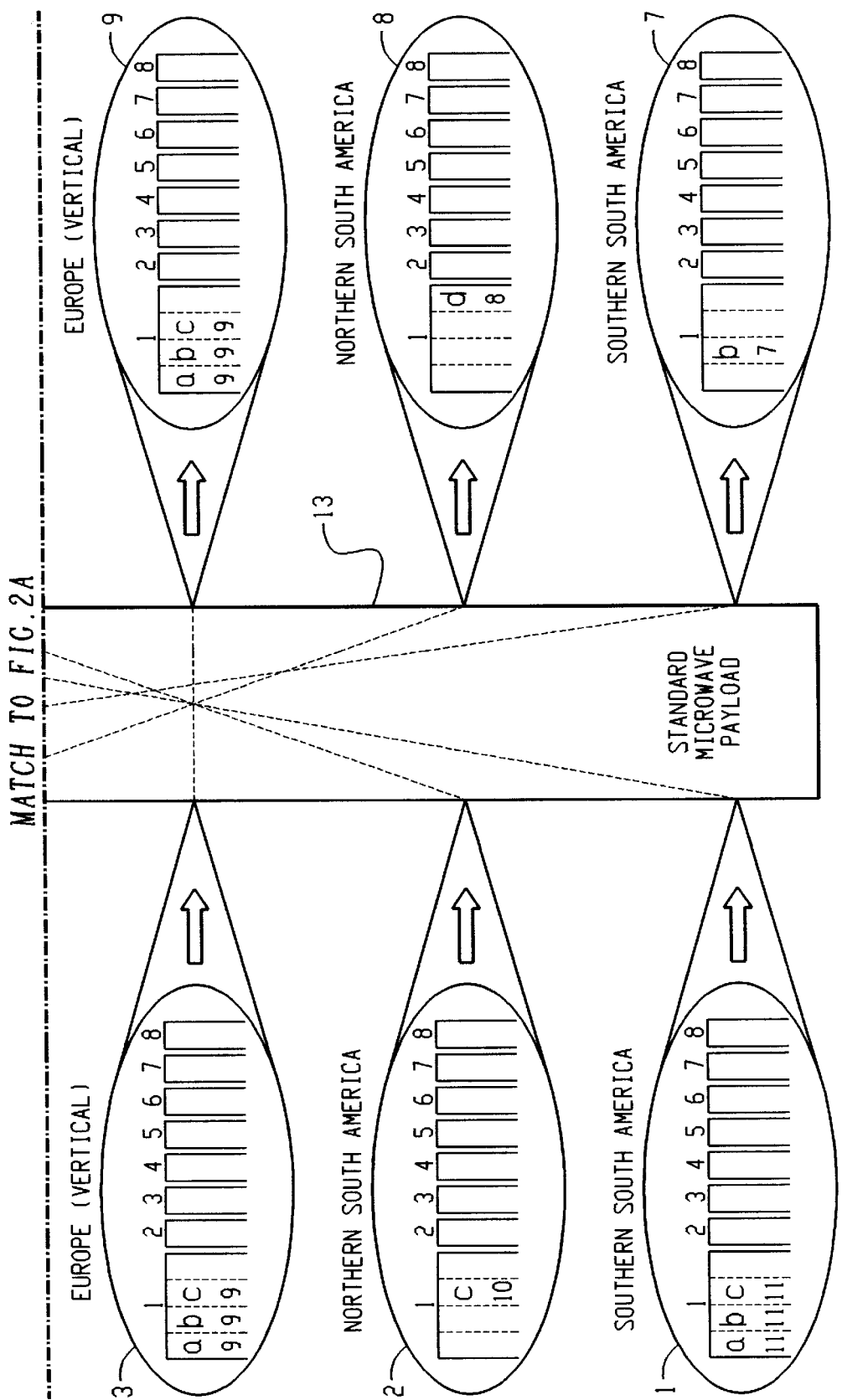
FIG. 2 shows a prior art system that utilizes a standard microwave payload with partial transponder utilization.

Referring to the prior art in FIG. 2, consideration is given to a 6-beam satellite in which each beam is divided into 8 channels. In the drawing only the first channel in each input and output beam is shown in detail, i.e. each of the first channels is shown as containing four subchannels of communications information labeled "a" to "d" respectively. It will be understood that each of the other channels in each beam will also generally contain several subchannels of communications information as described with reference to FIG. 1. The input beams 1 to 6 are derived from terrestrial sources as shown. Output beams 7 to 12 are directed to terrestrial destinations through the satellite payload 13 as is well known in the art. It should be understood that although all beams are shown as containing eight channels, this may not be the case and more or fewer channels may be transmitted in any beam. Similarly, there may be more or fewer than four subchannels in each channel.

The architecture of the satellite system shown in FIG. 2 allows the channels from the various incoming beams to be switched to different outputs. For example, the first three subchannels of channel 1 of beam 1 are destined for the west coast of North America (beam 11) and are labelled "a11" to "c11" respectively. Similarly, the subchannel contents of channel 2 of beam 1 may be directed to a different output beam, such as beam 7: (this is not shown). However, note that if the channel is only partially utilized, for example channel 1 of beam 1 is shown as having subchannel "d" unused, i.e. the channel is only 75 percent utilized, the remaining capacity (in this case 25 percent) of the channel is "wasted", since the satellite is limited to switching an entire input channel to a single outgoing beam.

Figure 3A:
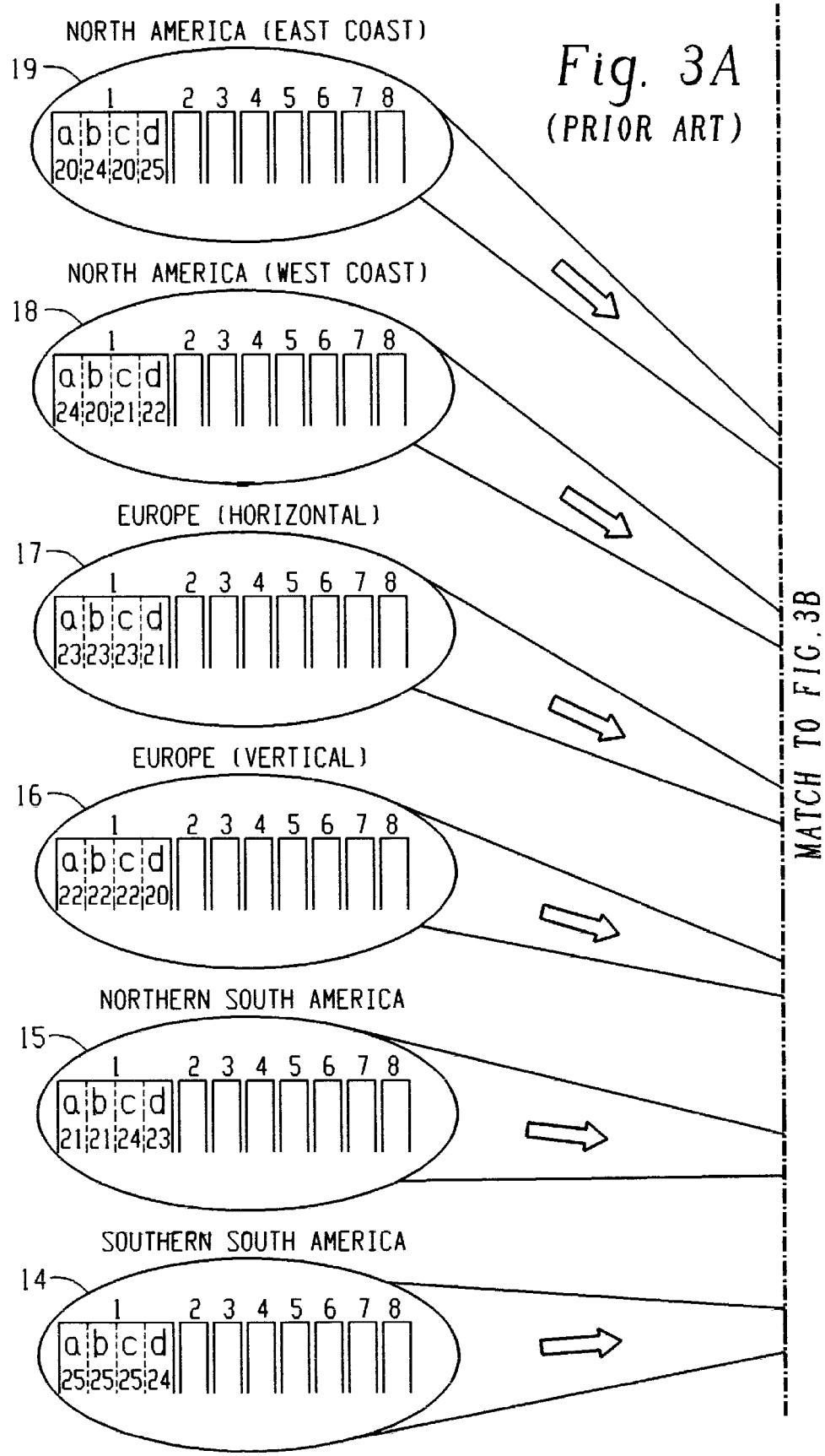
FIG. 3 shows the prior art improvement as described in the Ito patent.
Figure 3B:
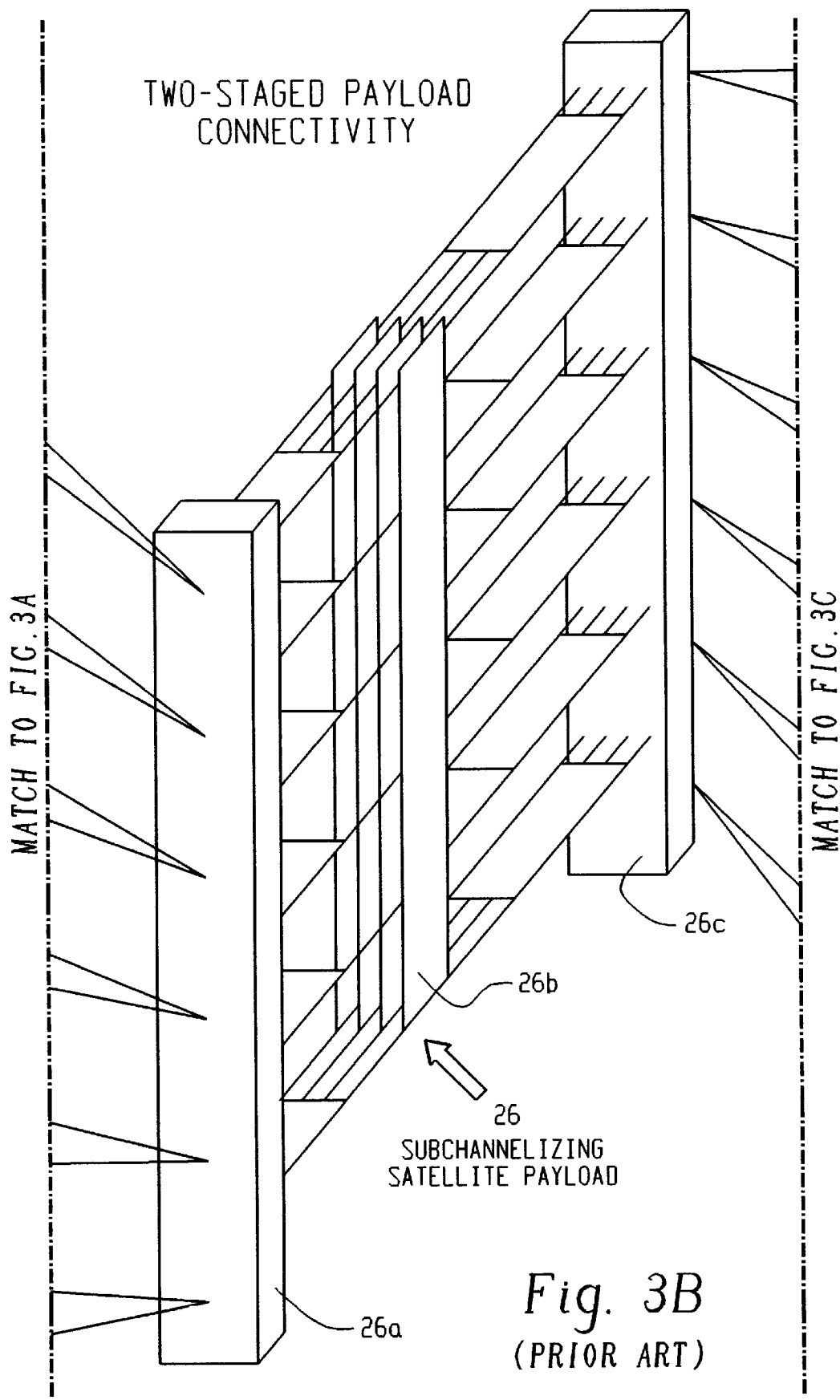
Figure 3C:
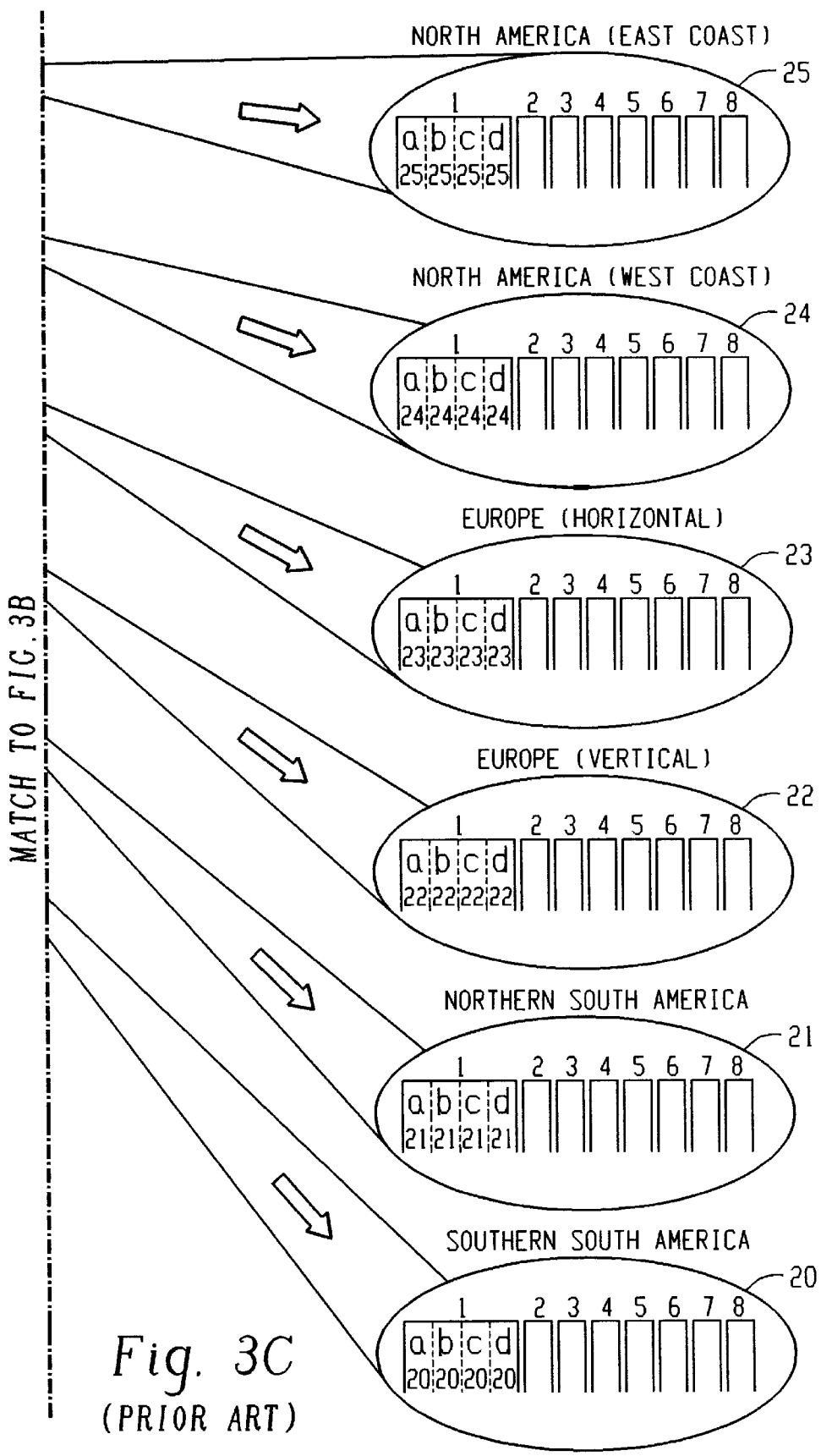

FIG. 3 shows a configuration using the teaching of Ito referred to above. The Ito disclosure teaches a two-level subchannelizing system in which, for a 6-by-6 satellite, input beams 14 to 19 are connected to a satellite payload (shown generally at 26) which splits each beam into its respective channels in a first stage demultiplexer (26a). A second stage (26b) employing SAW filters and solid-state (GaAs FET) switches further divides each channel into subchannels, interbeam connects these subchannels and recombines the subchannels into newly constructed channels. These channels are then recombined in the output multiplexer (third) stage (26c) for distribution to the output antennas (20–25).

Figure 4:
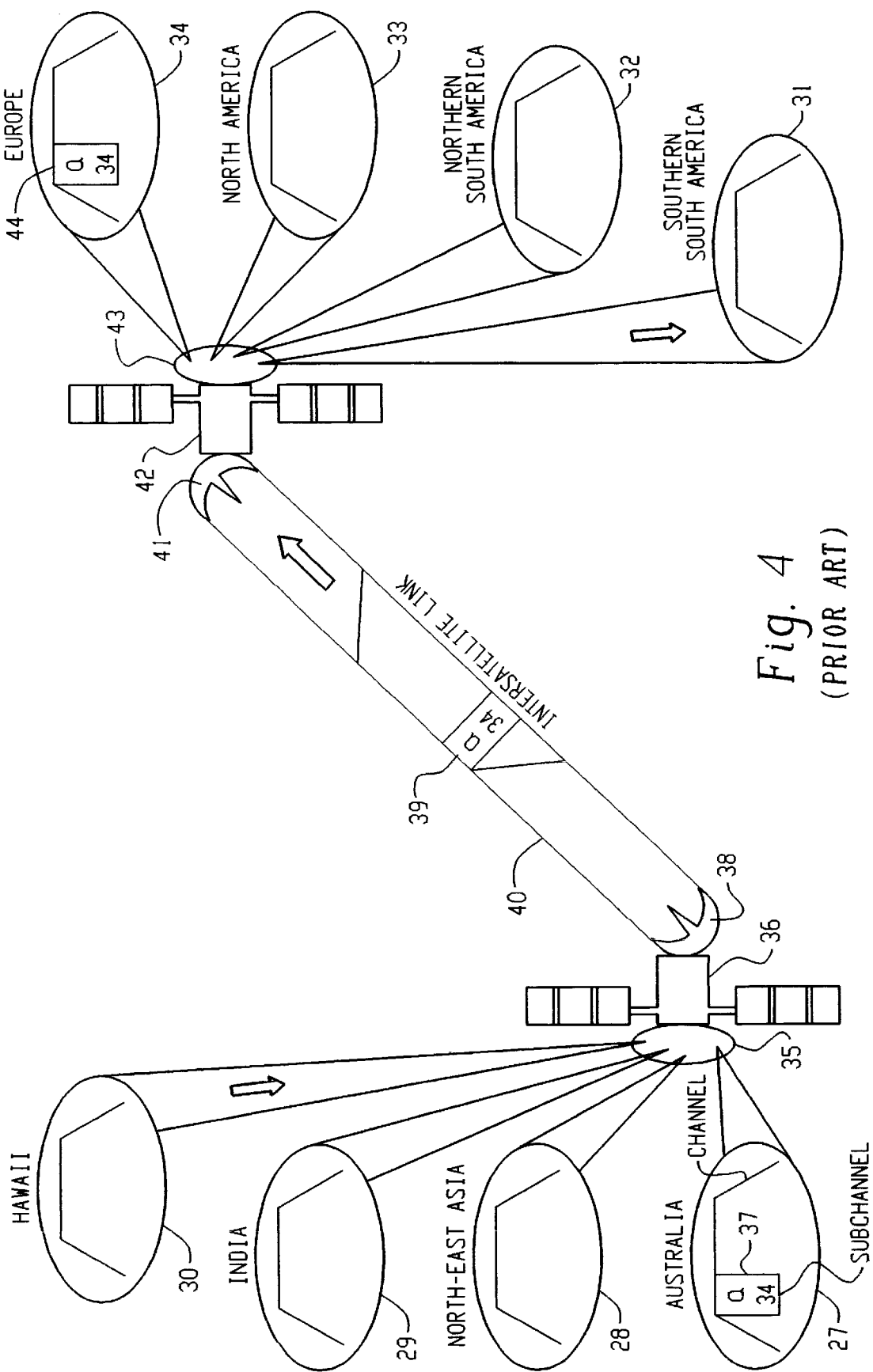
FIG. 4 shows a prior art fixed satellite service system using an intersatellite link.

Referring now to FIG. 4 in the drawings, a standard prior art communication system using an intersatellite link is shown. Radio-frequency signals comprising each of four incoming beams shown as 27 to 30 respectively, arrive at the input antenna 35 of a satellite 36 located at the equator over (for greatest convenience) the Pacific Ocean. The regions (27 to 30) transmitting to the satellite 36 are shown as being located in Australia, North-East Asia (e.g. Japan), India and Hawaii respectively. Although antenna 35 is shown as a single unit, it may consist of a group of antennas or a single multi-feed orthogonally polarized device.

A second satellite 42 serves the North and South American continents as well as parts of Europe. It would normally be placed at the equator over the Atlantic Ocean. The longitudinal positions of the two satellites 36 and 42 would be such that each satellite is in line of sight of the other. According to this arrangement, an intersatellite link 40 is established between the satellites 36 and 42 and it uses antennas 38 and 41 respectively. The link would normally be of a bandwidth sufficient to handle at least two subchannels (four or more are preferred). The link is preferably at a microwave frequency, e.g. 30 to 60 GHz, but, alternatively, could be at a lower RF frequency, or it could be an optical link using a laser beam or some other type of light source.

If, as shown in this example, Australia is transmitting to Europe, it captures the intersatellite link to the exclusion of the other regions and sends the information "a34" (shown at 37) over the link 40 (shown at 39). The information is forwarded to the appropriate subchannel (shown at 44) in the chosen destination (beam 34). In this case, Europe is the destination chosen, but the information could have been directed to any of the regions being served by satellite 42 provided, of course, there was sufficient channel capacity.

It may be seen in this example of the prior art system that there are severe constraints on the use of the system and that, if the information being transmitted does not require the full bandwidth capacity of the link transponder in satellite 36, there is a potential for waste in the form of power and system utilization. In the example given, the information being transmitted from Australia occupies only 25 percent of the available intersatellite link's channel, (assuming that only one of four available subchannels of equal bandwidth is employed). Although the connectivity problems could be alleviated by providing additional channels in the intersatellite link, this would not address the problem of inefficiency in channel-carrying capacity and would add to the complexity, cost and weight of the satellite payload.

It should be noted that, firstly, the preceding and following discussion give examples only and the invention is not limited to communications satellites over the Pacific and Atlantic Oceans. Secondly, to simplify the drawings, only one channel in each beam is shown. For example, beam 27 (Australia), in addition to the channel containing information 37, would generally also contain additional other channels arriving at the antenna array 35 of satellite 36. Similarly, each of the other regions (28 to 30 and 31 to 34) would support more than the one channel shown per beam.

Figure 5:
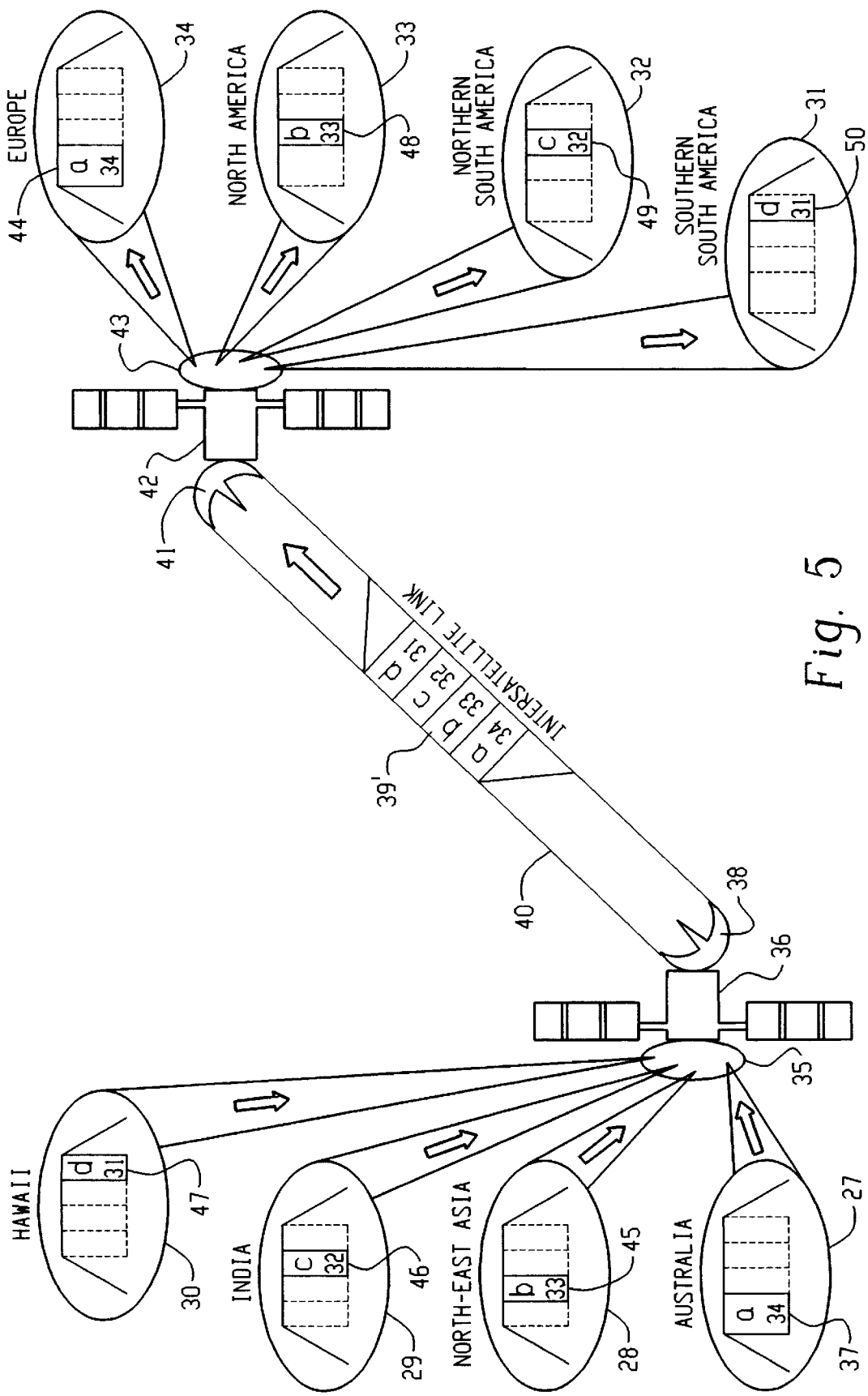
FIG. 5 shows one embodiment of the invention incorporated in an FSS system and in which the intersatellite link is used to serve, simultaneously, several incoming beams.

FIG. 5 shows the system of FIG. 4 embodying the present invention. In the improved system according to the present invention, at least one channel in each of the incoming beams is divided into subchannels. Use may be made of (SAW) technology as described in the Ito patent. Alternatively, the user may choose to employ partial subchannelization as described in our copending United States patent application referred to above, using either analog SAW technology or a transparent digital processor. The actual method of subchannelizing is not critical and any suitable method taught in the prior art could be used. On board the satellite, the processor acts to interbeam switch information at the subchannel level, as taught in the prior art. The output (intersatellite linking) beam 40, which includes channel 39' and its contents, is treated by the on-board circuitry as any other standard output beam (i.e. it is an output of one of the switch gear output multiplexers that is then routed to the intersatellite link transmitter.) However, the intersatellite beam's frequency may differ, for convenience or security or some other reason, from the frequency of the standard up- or down-link frequencies.

Using the system described, it is now possible for two or more regions to make use of a single channel in the intersatellite link. The first (or "a") subchannel (shown at 37) from Australia transmits to Europe (shown at 44), as described with respect to FIG. 4. However, because of the ability to interbeam switch at the subchannel level, it is possible to connect the second (or "b") subchannel (45) from another region (North-East Asia) being served by satellite 36 to another region (in this case North America) being served by satellite 42, the information appearing in the respective second subchannel as shown at 48. Similarly, the third (or "c") subchannel (46) from India may be transmitted to Northern South America (49) and the fourth (or "d") subchannel (47) from Hawaii may be transmitted to Southern South America (50). The ideal situation is shown where the intersatellite link 40 (which is assumed to have four subchannels) is fully utilized and all four items of information from the respective regions 27 to 30 are shown in the intersatellite link channel 39'. Thus by combining an intersatellite link with on-board subchannel switching capability, an improved bent-pipe intersatellite linked system is achieved which maximizes the bandwidth efficiency of the intersatellite link.

In the case described, it should be noted that both satellites 36 and 42 must have subchannel-handling capability. In satellite 36 incoming channels are subchannelized, the subchannels are interbeam switched and finally combined for the intersatellite link feed. In like manner, satellite 42 treats the intersatellite link as it does any other incoming beam and performs the action of subchannelizing, interbeam switching and combining with other subchannels to form new channels for the down links to Earth.

Figure 6:
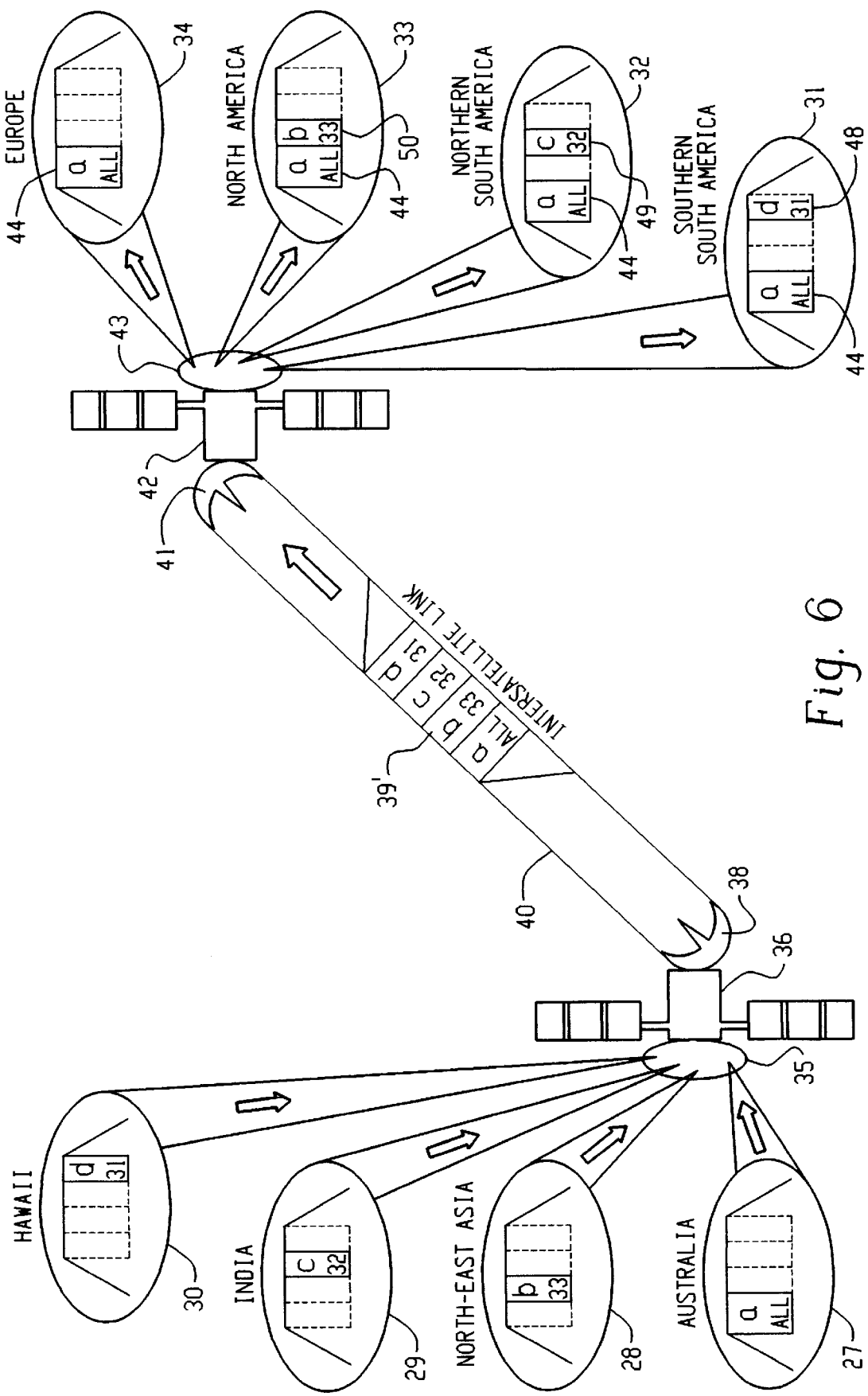
FIG. 6 shows another embodiment of the invention incorporated in an FSS system in which a broadcast mode is used.

As taught in the prior art, by appropriate switching arrangements on board the satellites, it is possible to place the satellite 42 in broadcast mode. As an example, FIG. 6 shows an arrangement whereby information (27) from the Australian up-link may be distributed to all the regions served by satellite 42 as shown at 44 in each region served by satellite 42. It may be noted that this does not impede the relay of single-destination, i.e. non-broadcast, information (46 to 47) by the other three regions being served by satellite 36 to selected regions in the footprints of satellite 42 (shown as 48 to 50). By extension, a limiting case is the possibility for each region served by satellite 36 to broadcast to all regions served by satellite 42, within the limits of satellite transponder, switching and powerhandling capacity.

Figure 8:
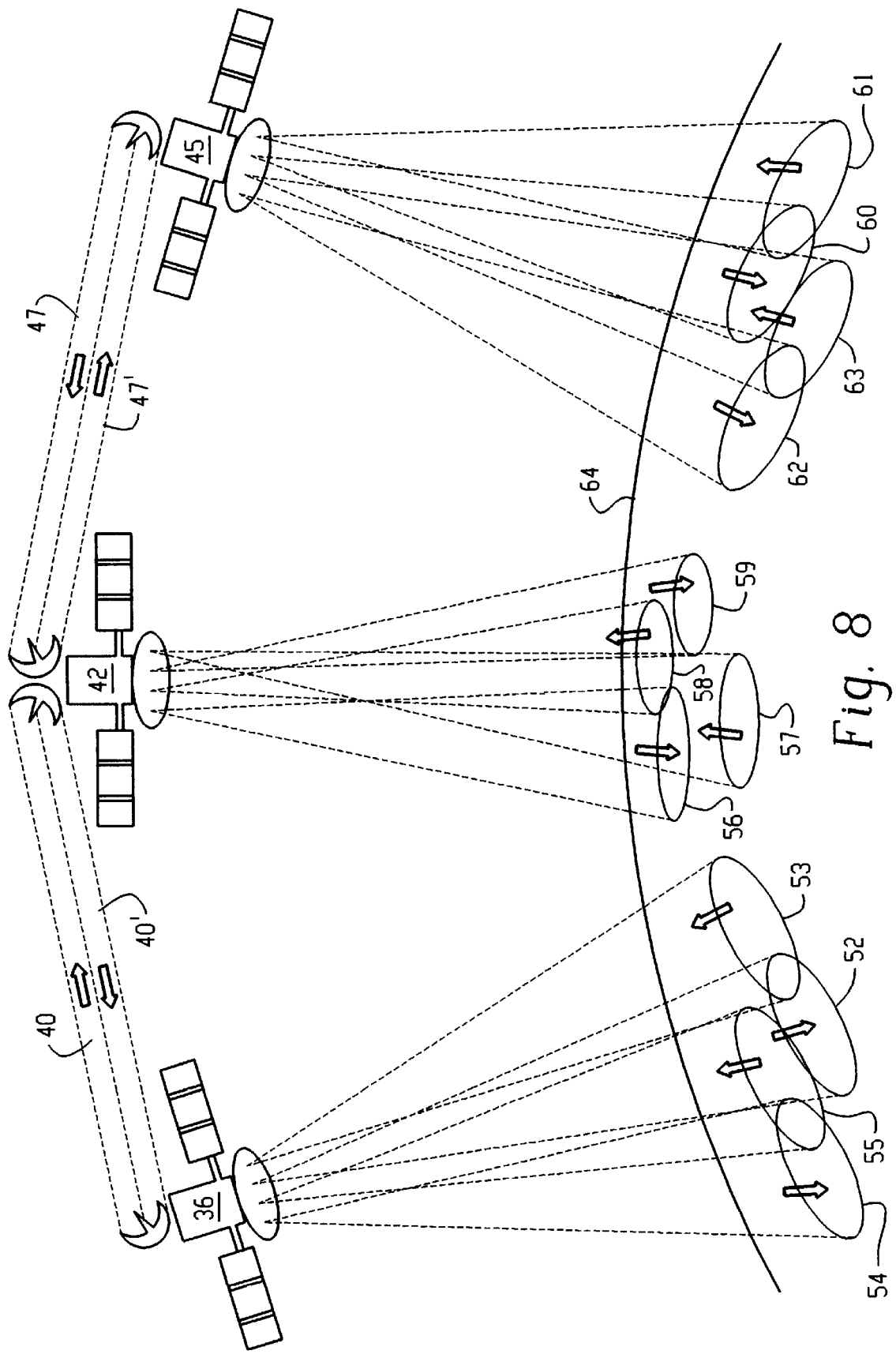
FIG. 8 shows the use of the invention in relation to a constellation of communications satellites.

In the general case, a satellite used in this invention may be one in a constellation of such satellites. FIG. 8 shows three such satellites, although there may be additional satellites forming a chain or matrix of communications nodes. Each satellite can both receive and transmit information from and to other satellites and from and to the ground.

Figure 7:
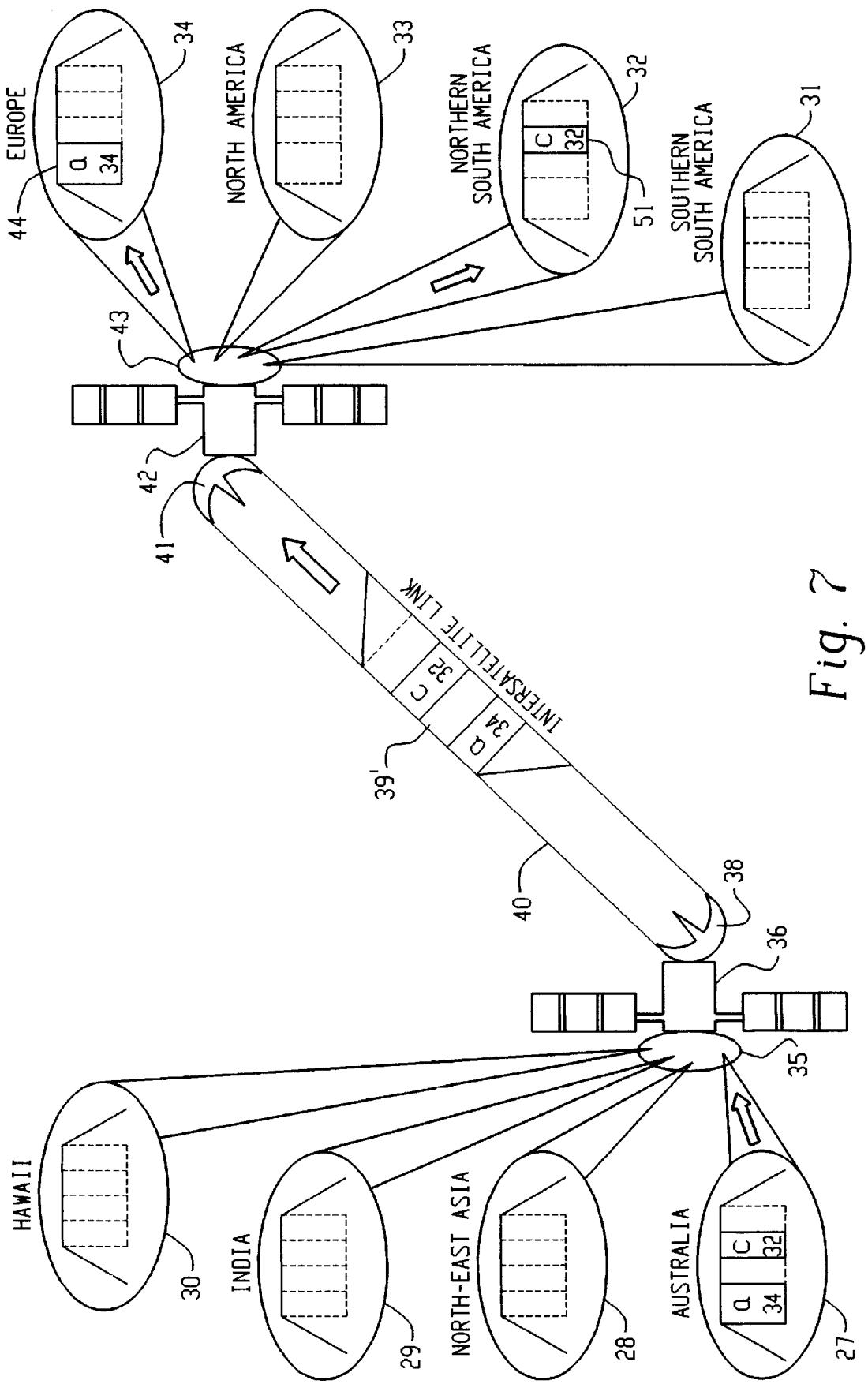
FIG. 7 shows an embodiment of the invention in which the intersatellite link serves two satellites, only one of which is utilizing subchannelizing technology.

It is also possible to make some limited use of the invention where only one of the satellites is using a capability to subchannelize and interbeam switch. This may be a case when it is decided not to use on-board switching capability or if the satellite is not capable of performing subchannel operations. FIG. 7 shows the case where one channel's contents (two subchannels are placed on the beam from Australia) are transmitted over the intersatellite link 40 to satellite 42. In satellite 42 the incoming intersatellite link is subchannelized and interbeam switched to deliver the contents to two down-link beams (in this case Europe at 44 and Northern South America 51 respectively are suggested). It should be apparent to a skilled person that if satellite 36 has subchannel-handling capabilities and satellite 42 does not, then subchannels from two separate sources, e.g. Australia and India, could be combined in satellite 36 for intersatellite transfer and onward transmission to a single terrestrial destination, e.g. Europe.

It should be recognized that, for clarity, only part of the satellite communications system has been shown. Both satellites 36 and 42 would normally be part of a regional system. FIG. 8 describes this: however, not all beams are shown. For example, satellite 36 is shown to be receiving two beams (53 and 55) from the Earth (62). Also shown is the intersatellite beam 40 transmitted to satellite 42. However, satellite 36 also transmits beams (52 and 54) to the Earth. In addition, satellite 36 receives communications signals from satellite 42 over the return intersatellite link (40'). To complete the system, satellite 42, in addition to transmitting several beams (shown as 56 and 59) to the Earth, would receive beams (57 and 58) from terrestrial sources as well as the intersatellite beam 40 received from satellite 36. In keeping with the foregoing description of a typical FDM satellite system, the beams to and from satellites 36 and 42 would normally include several channels (e.g. eight) and each channel would consist of several subchannels (e.g. four). As described above, the intersatellite link 40 would be supplemented by a complementary link 40' providing transmissions in the reverse direction i.e. from satellite 42 to satellite 36.

Finally, the system shown could easily be extended to form part of a matrix or constellation of satellites, where direct intersatellite links could be maintained by one satellite with more than one other satellite. In FIG. 8, satellite 42 is shown as being directly linked with another satellite shown at 45 via intersatellite links 47 (forward direction) and 47' (return direction). Similar to satellites 36 and 42, satellite 45 has down-links (60 and 62) and up-links (61 and 63). This application of the invention would be particularly useful where geostationary satellites are arranged to provide near-global communications coverage or in the situation where the satellites are not geostationary, but are part of, for example, a constellation of satellites in low-earth or medium-earth orbit.

What has been described is a bent-pipe communications satellite system. In general, at least part of the information contained in M incoming beams to a first satellite may be combined together and transferred by intersatellite link to a second satellite. The second satellite can separate the information out and place the separated information on N outgoing beams. M and N are natural numbers. One limiting case, M=1 and N=2, is a broadcast configuration described with respect to FIG. 6 in which satellite 36 does not need subchannelizing capability but satellite 42 does subchannelize the signals. In this limiting case, only one up-link is participating and only two down-links are making use of the broadcast facility.

By way of elaboration, information from the ground in beam 55 uplinked to satellite 36 may be retransmitted back to the ground via a beam such as 52, or may be transmitted to satellite 42 via intersatellite link 40. At this point, the information is treated as any other incoming information and may be downlinked by means of a beam such as 56, or may be forwarded to a further satellite such as 45 for further handling. Although satellites 36 and 45 are shown to be terminations of a chain of satellites, each of these could be linked to additional satellites in addition to satellite 42. Also, in a matrix configuration, each satellite could have intersatellite links to more than two other satellites. Consequently, information in the intersatellite link can come from several different sources (uplinks or intersatellite links) and can be split up and sent to different destinations (downlinks or further intersatellite links).

Another limiting case is where M=2 and N=1. In this case two incoming subchannels are combined in satellite 36 and are directed to a single destination by satellite 42. In this case, satellite 42 would not need subchannelizing capability to handle the signals.

The embodiments of the invention in which an exclusive property or privilege is claimed is defined as follows:

What is claimed:

1. A satellite communications system utilizing a multi-beam bent-pipe architecture including:
    a first communications satellite including means for receiving M electromagnetic radiation beams from each of M information sources;
    a second communications satellite including means for transmitting N electromagnetic radiation beams to each of N information destinations;
    where M and N are natural numbers and the sum of M and N is equal to or greater than 3;
    means in said first satellite for transmitting an intersatellite electromagnetic radiation beam to said second satellite;
    means in said second satellite for receiving the intersatellite electromagnetic radiation beam from said first satellite;
    said intersatellite beam including at least one intersatellite communication channel comprising a plurality of intersatellite subchannels;
    each of said M electromagnetic radiation beams including one or more incoming communication channels, at least one of said incoming communication channels in each of said M beams including a plurality of incoming subchannels;
    each of said N electromagnetic radiation beams including one or more outgoing communication channels, at least one of said outgoing communication channels in each of said N beams including a plurality of outgoing subchannels;
    interbeam switching means in said first satellite for directing the information contents of a plurality of incoming subchannels into respective ones of said plurality of intersatellite subchannels;
    interbeam switching means in said second satellite for directing the information contents of said plurality of intersatellite subchannels into respective outgoing subchannels of said N outgoing channels;
    whereby information contained in incoming subchannels associated with said M beams received from said M information sources served by said first communications satellite is interbeam-switched and transmitted in outgoing subchannels associated with said N beams transmitted to said N information destinations served by said second satellite.

2. The communications system of claim 1 wherein M equals 1 and N equals 2 and said second satellite contains means to interbeam switch subchannels.

3. The communications system of claim 1 wherein M equals 2 and N equals 1 and said first satellite contains means to interbeam switch subchannels.

4. An intersatellite communications system utilizing bent-pipe multi-beam architecture including:
    means in a first communications satellite to receive a first incoming beam containing a first incoming channel from a first information source and a second incoming beam containing a second incoming channel from a second information source, said first incoming channel containing a first plurality of incoming subchannels and said second incoming channel containing a second plurality of incoming subchannels, one of said first plurality of incoming subchannels containing first communications information and one of said second plurality of incoming subchannels containing second communications information;
    means in said first satellite to combine said subchannels containing said first and second communication information respectively and to place said combined subchannels in a single channel in an electromagnetic beam carrier;
    means to transmit said carrier to a second communications satellite;
    means in said second satellite to receive said carrier and to separate the combined subchannels in said single channel in said carrier;
    means in said second communications satellite to transmit a first outgoing beam containing a first outgoing channel to a first information destination and a second outgoing beam containing a second outgoing channel to a second information destination, said first outgoing channel containing a first plurality of outgoing subchannels and said second outgoing channel containing a second plurality of outgoing subchannels;
    means in said second communications satellite to place said first communications information contained in one of said separated subchannels in one of said first plurality of outgoing subchannels;
    and means in said second communication satellite to place said second communications information contained in the other of said separated subchannels in one of said second plurality of outgoing subchannels.

5. The system of claim 4 in which said first and second incoming beams are microwave-frequency radio beams from respective terrestrial information sources.

6. The system of claim 4 in which said first incoming beam is a microwave-frequency radio beam from a terrestrial source and said second incoming beam is an electromagnetic beam from a third satellite.

7. The system of claim 6 in which said electromagnetic beam is a microwave-frequency radio beam.

8. The system of claim 6 in which said electromagnetic beam is an optical-wavelength carrier beam.

9. A multi-beam bent-pipe satellite comprising:
    a plurality of receivers for receiving incoming information beams from the ground, wherein the incoming information beams include channels of information, and at least one channel in each of the incoming information beams further includes subchannels of information;
    a partial subchannelizing processor connected to the plurality of receivers, said partial subchannelizing processor including a coaxial switching network for switching the channels of information, a subchannel switching network connected to some, but not all of the channels of information that extracts the subchannel information from the incoming information beams and inter-beam switches the subchannel information, and means for combining the switched subchannel information and the switched channel information into a plurality of outgoing information beams;
    a plurality of transmitters connected to the outgoing information beams for transmitting the outgoing beams to the ground; and
    an intersatellite link connected to at least one of said outgoing information beams, wherein the intersatellite link transmits the outgoing information to another satellite.

10. The bent-pipe satellite of claim 9, wherein each receiver includes a corresponding antenna to capture the incoming information beam.

11. The bent-pipe satellite of claim 9, where the plurality of receivers are connected to a single multi-feed orthogonally polarized antenna which captures all of the incoming information beams.

12. The bent-pipe satellite of claim 9, wherein the subchannelizing processor circuitry that extracts the subchannel information from the incoming information beams includes Surface Acoustic Wave (SAW) filters.

13. The bent-pipe satellite of claim 9, wherein the subchannelizing processor circuitry that interbeam switches the subchannel information comprises a solid-state switching matrix.

14. The bent-pipe satellite of claim 9, wherein the subchannelizing processor circuitry that interbeam switches the subchannel information comprises a transparent digital processor.

15. The bent-pipe satellite of claim 14, wherein the transparent digital processor includes digital filters and a digital switching network.

16. The bent-pipe satellite of claim 9, wherein the incoming information beams are microwave-frequency beams.

17. The bent-pipe satellite of claim 9, wherein the intersatellite link is a microwave-frequency beam.

18. The bent-pipe satellite of claim 9, wherein the intersatellite link is an optical-wavelength beam.

19. The bent-pipe satellite of claim 9, wherein the outgoing information beam connected to the intersatellite link includes subchannel information from more than one incoming information beam.

20. An improved multi-beam bent-pipe satellite of the kind that receives a plurality of incoming beams of information and transmits a plurality of outgoing beams of information, wherein the incoming and outgoing beams include channels of information, and at least one of the channels in each beam further includes subchannels of information, the improvement comprising:

a partial subchannelizing processor including channel switching circuitry that interbeam switches the channels of information, and subchannel switching circuitry in parallel with the channel switching circuitry that selects the subchannel information from the incoming beams, and interbeam switches the subchannel information onto a plurality of outgoing channels, said outgoing channels being further combined with the switched channels into outgoing beams; and an intersatellite link connected to at least one outgoing beam that includes the subchannel switched information, wherein the intersatellite link transmits the outgoing beam to another satellite.

21. The improved bent-pipe satellite of claim 20, wherein the subchannelizing processor includes SAW filters and a solid-state switching network.

22. The improved bent-pipe satellite of claim 20, wherein the subchannelizing processor includes a transparent digital processor.

23. The improved bent-pipe satellite of claim 22, wherein the transparent digital processor includes digital filters and a digital switching matrix.

24. The improved multi-beam bent-pipe satellite of claim 20, wherein the channel switching circuitry includes a coaxial switching network.

25. The satellite communications system of claim 1, wherein at least one of the interbeam switching means comprises a partial subchannelization processor.

26. The satellite communications system of claim 25, wherein the partial subchannelization processor includes channel switching circuitry that interbeam switches the communication channels, and subchannel switching circuitry connected to some, but not all of the channels that selects the subchannel information and interbeam switches the subchannel information.

27. The intersatellite communications system of claim 4, wherein the means to combine comprises a partial subchannelization processor.

28. The satellite communications system of claim 27, wherein the partial subchannelization processor includes channel switching circuitry that interbeam switches the incoming channels, and subchannel switching circuitry connected to some, but not all of the channels that selects the incoming subchannels, interbeam switches the subchannels, and combines the incoming switched subchannels.

* * * * *